United States Patent [19]

Glass

[11] 4,320,467
[45] Mar. 16, 1982

[54] METHOD AND APPARATUS OF BUS ARBITRATION USING COMPARISON OF COMPOSITE SIGNALS WITH DEVICE SIGNALS TO DETERMINE DEVICE PRIORITY

[75] Inventor: Jeremy M. Glass, Sudbury, Mass.

[73] Assignee: Raytheon Company, Lexington, Mass.

[21] Appl. No.: 124,191

[22] Filed: Feb. 25, 1980

[51] Int. Cl.$^3$ .............................. G06F 9/46; H04Q 3/00
[52] U.S. Cl. .................................. 364/900; 340/825.5
[58] Field of Search ... 364/200 MS File, 900 MS File; 370/85, 94; 340/147 LP

[56] References Cited

U.S. PATENT DOCUMENTS

| | | | |
|---|---|---|---|
| 3,447,135 | 5/1969 | Calta | 364/200 |
| 3,796,992 | 3/1974 | Nakamura et al. | 340/147 LP |
| 3,815,099 | 6/1974 | Cohen | 364/200 |
| 3,909,790 | 9/1975 | Shapiro | 364/200 |
| 3,997,896 | 12/1976 | Cassarino, Jr. et al. | 364/200 |
| 4,017,841 | 4/1977 | Jensen | 364/900 |
| 4,096,571 | 6/1978 | Vander Mey | 364/200 |

*Primary Examiner*—Raulfe B. Zache
*Attorney, Agent, or Firm*—William R. Clark; Milton D. Bartlett; Joseph D. Pannone

[57] ABSTRACT

A bus arbitration method and apparatus for determining which of a plurality of devices desiring access to a common bus will gain access to the bus when it becomes available. Using the change of state of a common BUSY line to synchronize the simultaneous initiation of the arbitration process in each competing device, each device outputs a unique signal to a common arbitration line or lines. Each device monitors the composite signal on the arbitration line or lines and determines its priority relative to other devices. The device with the highest priority gains access to the bus and outputs a signal to the BUSY line until the bus is available for another arbitration.

14 Claims, 12 Drawing Figures ing access to the bus. In addition to the disadvantage of becoming unavailable by a single-point failure, a system utilizing this approach also provides relatively slow arbitration and often has the priority of devices determined by the physical positioning of device boards. Furthermore, if a device board is removed from the original system configuration, rewiring is generally required so that the bus available signal may be transferred past the open slot.

METHOD AND APPARATUS OF BUS ARBITRATION USING COMPARISON OF COMPOSITE SIGNALS WITH DEVICE SIGNALS TO DETERMINE DEVICE PRIORITY

The Government has rights in this invention pursuant to Contract Number F-30602-78-C-0027 awarded by the Department of the Air Force.

BACKGROUND OF THE INVENTION

In many digital systems, a plurality of devices share a common resource. For example, in most digital computers, devices such as processors and memories share a common bus over which addresses, instructions, and data are transferred. In the systems, it is apparent that if the resource such as a bus cannot be shared simultaneously, there must be a means to determine what device will have access to the resource when it becomes available.

In some systems, where processing and input/output are provided by a single processor, there may be no arbitration for a common bus because the processor always determines the sequence of bus activity. For example, the processor may put an address for an instruction on the bus and then wait for the memory to respond. However, when there are a plurality of processors such as in a distributed processing system or when there is direct memory access, a method may be required to arbitrate what device will gain access to the bus when the present cycle is finished. There have been a number of prior art solutions to the common resource arbitration problem, each solution typically having advantages and disadvantages.

One prior art method of providing bus arbitration is to use a centralized priority encoder which receives an input from each device that requests the bus. Generally, the encoder has a plurality of lines for output over which it transmits a priority code indicative of which device requesting the bus has the highest priority. A significant disadvantage of this type of system is that a single point failure in the encoder will cause the entire system to become unavailable. Accordingly, this method is not preferable for a fault-tolerant system. Furthermore, the approach generally requires at least one line connected between each device and the encoder in addition to the priority code lines.

A second prior art approach to bus arbitration is commonly referred to as "daisy chaining." In this method, a bus available signal is passed from device to device in a priority order. A device desiring access to the bus captures the signal and gets access to the bus. In addition to the disadvantage of becoming unavailable by a single-point failure, a system utilizing this approach also provides relatively slow arbitration and often has the priority of devices determined by the physical positioning of device boards. Furthermore, if a device board is removed from the original system configuration, rewiring is generally required so that the bus available signal may be transferred past the open slot.

A third prior art method uses a set of lines whereby a lower priority device is blocked by a higher priority device requesting access to the bus. This approach to bus arbitration has the disadvantage of requiring a relatively large number of interconnect block lines between devices. As the lines are generally connected in open collector logic, a considerable amount of power is consumed by the system in maintaining the blocking signal.

A bus arbitration apparatus was required for a distributed processing fault tolerant space system wherein arbitration was to be accomplished in a relatively short time period, with a minimum number of interconnect lines, and with a minimum amount of power. All of the prior art bus arbitration approaches had significant drawbacks.

SUMMARY OF THE INVENTION

The invention discloses a bus arbitration circuit of a device which is connected to a common bus with another device, the function of the circuit being to determine the priority of the device relative to the other device in gaining access to the bus. Typically, the bus is used to transfer digital information between devices. The circuit comprises means for providing a first signal to a line interconnecting the two devices, the signal being determined by the priority of the device. The providing means comprises means for synchronizing the commencement of the first signal with a second signal from the other device to form a composite signal on the interconnecting line so that determining means can determine the priority of the device in response to the first and composite signals. The signal may preferably be pulses, sets of pulses, or a logical voltage state the duration of which defines the priority. The providing means may comprise a microprocessor. Generally, once a bus arbitration circuit determines that its device has the highest priority, it provides a signal to another component of the device which initiates a transfer of digital information to the bus.

The invention may also be practiced by a bus arbitration circuit of a first device connected to a common bus with other devices, the circuit comprising means for providing at least first and second signals respectively to first and second lines interconnecting the devices, the combination of each first and second signal uniquely identifying the priority of the device for gaining access to the bus, providing means being in synchronism with providing means of other devices to form composite first and second signals on said first and second lines, and means for comparing the first and second signal with first and second composite signals to determine the priority of the device relative to other devices.

The invention may further be practiced by the method of providing bus arbitration for the plurality of devices requesting simultaneous access to a common bus, the method comprising the steps of each device simultaneously providing a first signal to a first line to form a first composite signal, said first line interconnecting said plurality of devices, each device simultaneously providing a second signal to a second line to form a second composite signal, said second line interconnecting said plurality of devices, the combination of said first and second signals of each device identifying the priority of its device, and each device comparing its provided first and second signals respectively with said first and second composite signals to determine its priority relative to other devices in gaining access to the bus.

BRIEF DESCRIPTION OF THE DRAWINGS

Other and further objects and advantages of the invention will become apparent in connection with the accompanying drawings wherein.

DESCRIPTION OF THE PREFERRED EMBODIMENT

Figure 1:
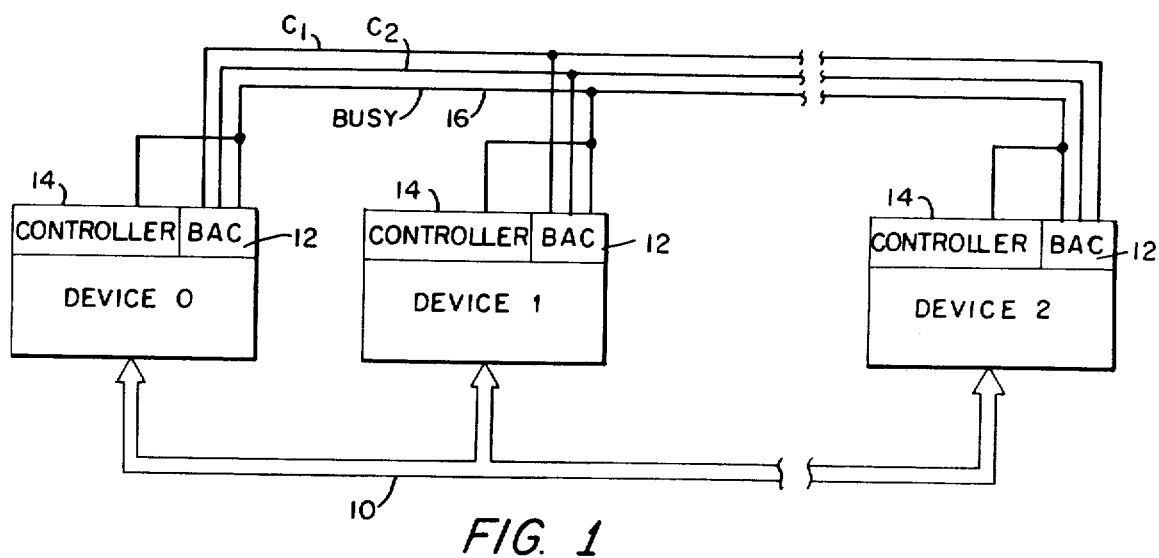
FIG. 1 is a functional block diagram of a digital system comprising devices 0-2 which are representative of a larger number of devices interconnected by a bus.

Referring to FIG. 1, there is shown a block diagram of a digital processing system. Devices 0, 1 and 2, which are representative of a larger number of devices, are interconnected by bus 10 which is the communications pathway for interdevice transfers of digital information such as addresses, instructions and data. Examples of devices are processors, memories, and input/output controllers. Because only one device may transfer digital information over bus 10 at any given instant of time, each device is provided with a bus arbitration circuit (BAC) 12 which is connected to the other bus arbitration circuits to arbitrate which device will gain access to bus 10 when it becomes available. After gaining access to the bus, a device becomes the bus master. First, the controller 14 of the bus master device provides a signal to BUSY line 16 to indicate to all of the other devices that the bus is not available for digital transfers. Next, the controller typically transfers a first digital word onto bus 10 that identifies the slave which is the intended receiver. Thereafter, the controller transfers the intended digital message onto bus 10 as it retains control of the bus until the transfer operation is completed. Interrupts to the transfer operation may be provided but an understanding of them is not required to teach the invention. At the completion of the transfer operation, the controller of the bus master device removes its signal from the BUSY line which indicates that the bus is available. The removal of the BUSY signal initiates another arbitration process among all devices desiring access to the bus to determine which will gain access.

Still referring to FIG. 1, bus 10 and interconnect lines C1, C2 and BUSY are shown functionally separate; in practice, however, it may be preferable to route bus 10 and lines C1, C2 and BUSY together as a common bus on the back plane even though specific lines may or may not be dedicated to the separate functions of digital information transfers and bus arbitrations.

Figure 2:
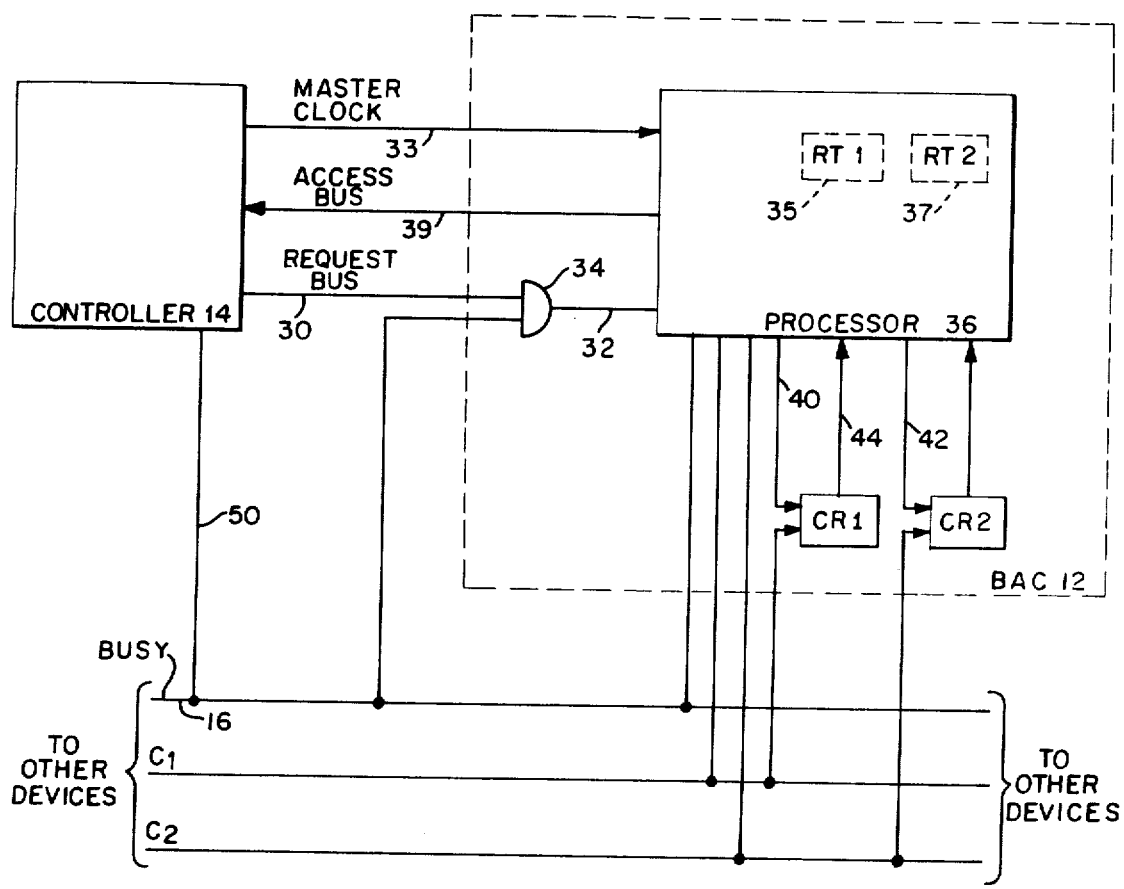
FIG. 2 is a schematic diagram of a bus arbitration circuit of devices 0–2 of FIG. 1.

Referring to FIG. 2, there is shown a controller 14 and bus arbitration circuit 12 of a single device with interconnections there between and to lines C1, C2 and BUSY. The design of a controller which provides timing and control signals for a device is well known to one skilled in the art. When a device has digital information to be transferred to another device, the controller of the device generates a REQUEST BUS signal which is or produces a HIGH voltage (logical 1) on REQUEST BUS line 30. The combination of a HIGH voltage on line 30 and a HIGH voltage on BUSY line 16 produces a HIGH voltage on line 32 at the output of AND gate 34; the HIGH voltage on BUSY line 16 indicates that bus 10 is available for digital information transfers. Line 32 is connected to an input port of processor 36 which may comprise a microprocessor such as, for example, an Intel 8085 microprocessor.

Figure 3:
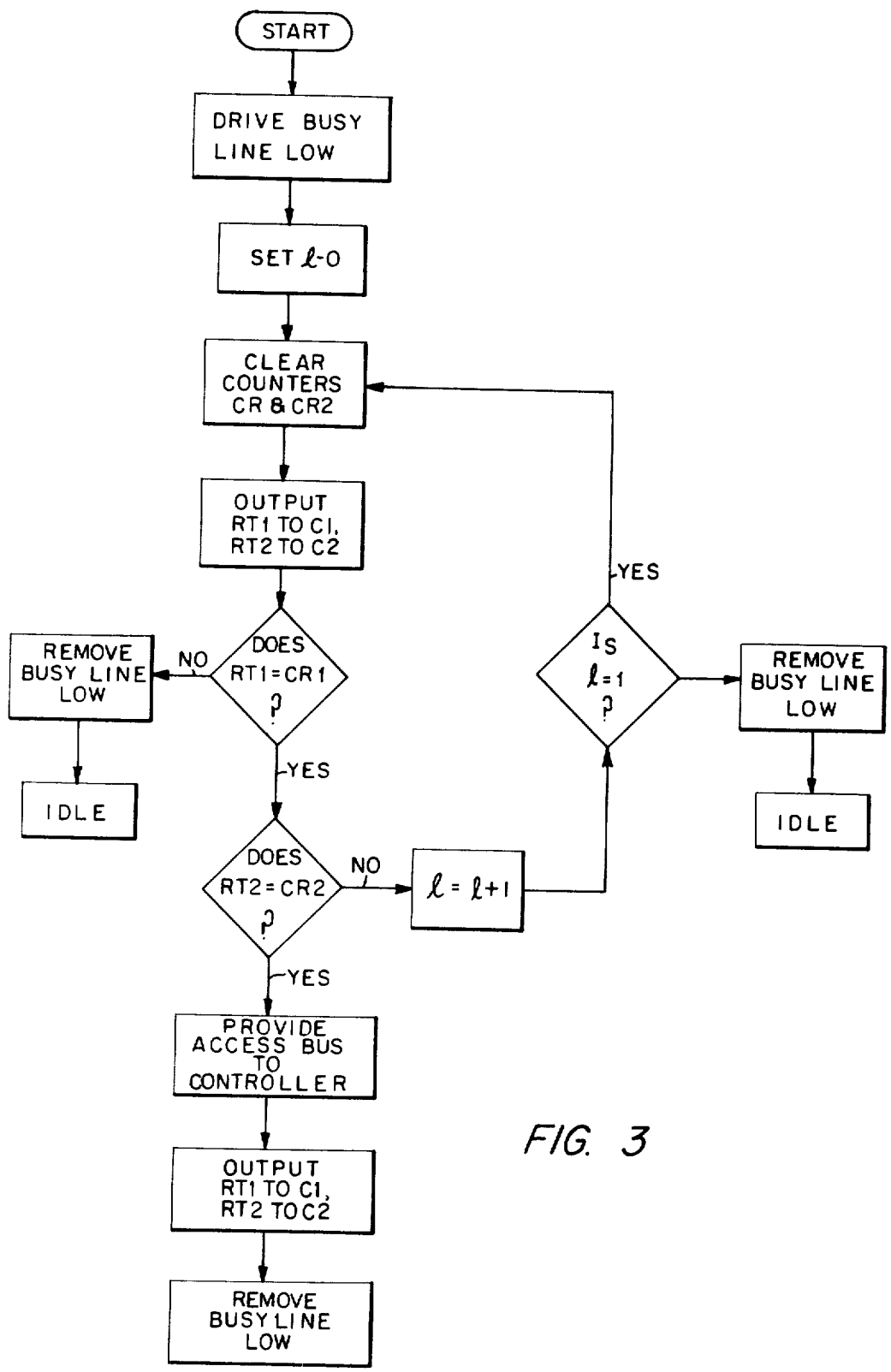
FIG. 3 is a flow diagram of the method used by the processor of FIG. 2 to provide bus arbitration.

The functional operation of processor 36 is depicted in the software flow diagram of FIG. 3. The programming of the processor from the flow diagram is a task that is well known to one skilled in the art. Referring to FIG. 3, the START of the arbitration process is initiated by a HIGH voltage input to the processor on line 32. The HIGH voltage may be an interrupt which directs the processor to the starting address of the arbitration program. The first step of the processor is to DRIVE BUSY LINE LOW. This action prevents a device from entering the arbitration process after arbitration has already been initiated by one or more other devices; as will be apparent later herein, the arbitration among devices must be synchronized to commence simultaneously. The synchronization is provided by a MASTER CLOCK which is provided to each processor of each device by its controller on line 33. If bus 10 is available as indicated by a HIGH voltage on the BUSY line, followed by a REQUEST BUS signal by a controller, the bus arbitration circuit will prevent other devices from entering arbitration by driving the BUSY LINE LOW and then will proceed to gain access to the bus for itself. If two or more devices generate a REQUEST BUS signal on the same MASTER CLOCK pulse at a time when the bus is available, each device will prevent other devices from entering the arbitration process and will then proceed through arbitration until one device gains access to the bus. If the bus has been busy, and a plurality of devices have raised their REQUEST BUS lines to a HIGH voltage, the synchronization of bus arbitration among those devices will be timed to the first MASTER CLOCK pulse after the BUSY line goes to a HIGH voltage.

Still referring to FIG. 3, the next step is SET L=0, where L is a variable. The purpose of this step will be better understood later herein with reference to a description of the method of arbitration. For here, it is sufficient to say that it provides control over a software loop.

The next step is CLEAR COUNTERS CR1 and CR2. The CLEAR is provided to CR1 on line 40 and to CR2 on line 42. As shown in FIG. 3, counter receiver 1 (CR1) is connected to line C1 and counter receiver 2 (CR2) is connected to line C2. Pulses on line C1 provide the increment for CR1; pulses on line C2 provide the increment for CR2. Accordingly, assuming no over flow, the contents of counters CR1 and CR2 represent the number of pulses on lines C1 and C2 respectively, since the last clear signal from processor 36. In other words, this step initializes counters CR1 and CR2 to count the pulses on line C1 and C2 during a predetermined time period.

Figure 4:
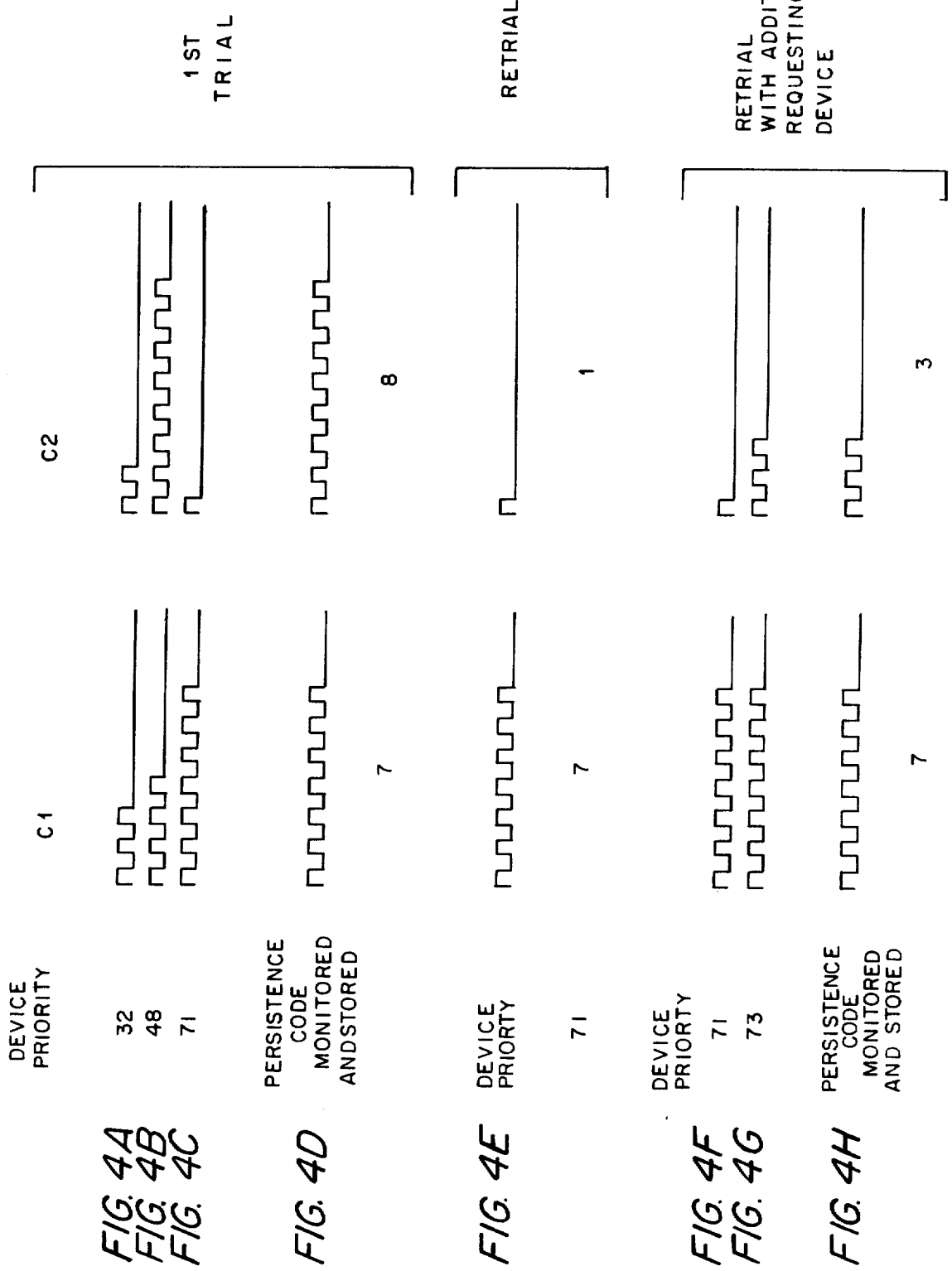
FIGS. 4A to 4H are an example of the pulse outputs of the processor of FIG. 2 during bus arbitration.

The next step is OUTPUT RT1 to C1, RT2 to C2. RT1 35 and RT2 37 stand for register transmit 1 and 2. These registers may be internal or external to the microprocessor. The contents of RT1 and RT2 will typically be alterable by software control, loaded from a front panel, or permanently fixed for a device. The values stored in RT1 and RT2 are indicative of the priority of the device in gaining access to the bus. As an example, a decimal priority system is described herein. Specifically, RT1 stores the tens digit of the priority and RT2 stores the ones digit. Using two registers for two digits and a decimal system, 100 (0–99) unique priorities can be represented and arbitrated. It is assumed that the higher the stored value, the higher the priority. As an example, if a device with a priority of 73 arbitrates for bus access with a device of priority 48, the device of priority 73 will prevail. Referring to FIGS. 4A through C, there is shown the number and timing of pulses output to lines C1 and C2 respectively for devices with respective priorities of 32, 48 and 71. It can be seen that the commencement of the pulse streams is synchronized so that the respective pulses from different devices occur simultaneously. The logic used should be of an open collector wire-or type so that even though a plurality of devices are connected to lines C1 and C2, any one device may cause the lines to change state. FIGS. 4A-C depict lines C1 and C2 as normally being a LOW voltage with HIGH's occurring at the pulses; in practice, it may be preferable to invert this and have lines C1 and C2 normally HIGH.

Again referring to FIG. 3, the next step is DOES RT1=CR1? It is remembered that RT1 contains the tens digit of the priority code of a device which is the number of pulses outputted by the device on line C1. It is also remembered that counter CR1 started with zero for content and was incremented by the pulses on line C1. Therefore, because the output of pulses of each device in the arbitration are synchronized, counter C1 of each device will contain the highest tens digit of pulses of a device in the arbitration. Referring to FIG. 4D, each device will have a value of 7 stored in counter CR1. If RT1 does not equal CR1, it is indicative that a higher priority device is requesting the bus. The device will therefore REMOVE BUSY LINE LOW and go to IDLE. In other words, the device withdraws from the present arbitration process and does not continue to hold the BUSY line LOW so that another arbitration process cannot begin. It is noted that no new arbitration will be initiated at this time, however, because at least one arbitration device must have matched the persistence code on line C1. That device would continue to hold the BUSY line LOW. CR1 is read by processor 36 on line 44. The delay before comparing RT1 and CR1 is long enough so that a device may output the maximum number of pulses to line C1; otherwise, a monitoring procedure is required which determines when pulses on line C1 cease.

Again referring to FIG. 3, the next step for those devices having the transmitted tens digit equal the received tens digit is DOES RT2=CR2? In other words, does the ones digit match? If the counted tens and ones digits match the respective transmitted digits, it means that there is no other higher priority device in the arbitration and the device will then PROVIDE ACCESS BUS TO CONTROLLER. At this time, the arbitration is complete; the controller has put out a REQUEST BUS signal to the bus arbitration circuit and the bus arbitration circuit has returned an ACCESS BUS signal on line 39 which indicates that the device has the highest priority for the bus which is presently available for transfer. The controller then uses line 50 to drive BUSY line 16 LOW to prevent other arbitrations until the bus becomes available at which time it removes the drive signal from line 16. After providing the ACCESS BUS SIGNAL TO THE CONTROLLER, the processor will OUTPUT RT1 to C1, RT2 TO C2 and then REMOVE BUSY LINE LOW. As will be described later herein, a retrial will be executed by a device that determines that there is no device having a higher priority tens digit but there may be a device having the same tens digit in higher priority ones digit. The priority of a device having gained access to the bus is retransmitted to prevent a device in retrial from obtaining the tens and ones digit match. The BUSY line is permitted to go HIGH so that a future arbitration will not be prevented. It is also noted that by this time, the controller of the device having gained access to the bus will have driven the BUSY line LOW so that arbitration for the bus will be delayed until the digital information transfer on the bus is completed.

If a bus arbitration circuit obtains a match with the tens digit but does not with the ones digit, it does not know whether the higher ones digit was transmitted by a device having the same tens digit in which case it should lose arbitration or by a device having a smaller tens digit in which case it should win arbitration. For example, referring to FIG. 4D, the device transmitting 71 could be competing against a device transmitting 72-78 in which case the other device should win. The uncertainty is resolved by a retrial including the steps of clearing the counters, retransmitting the priority on lines C1 and C2, and then comparing the digits. Remembering that any device not having a tens digit match will not participate in the retrial, a ones digit match and arbitration winner is now guaranteed. For example, see FIG. 4E where a device transmitting a priority of 71 is the only device in the retrial and therefore wins arbitration. If there had been a device transmitting a priority of 73 in the original group of 32, 48 and 71, it would have competed with the 71 in the retrial as shown in FIGS. 4F and 4G. The persistence as shown in FIG. 4H would have been 73 so that device wins arbitration. In that case, to prevent the device with a priority of 71 from initiating a second retrial, the variable L is incremented by 1 and if L≠1, another trial will not be executed. Rather, the device will REMOVE BUSY LINE LOW and IDLE until the device having gained access has completed its bus transfer; at that time, a new arbitration will commence.

The arbitration system thus far described has been with reference to a microprocessor and the software program executed therein. It may be preferable for some applications to implement the flow diagram of FIG. 3 with the use of hardware logic.

Figure 5:
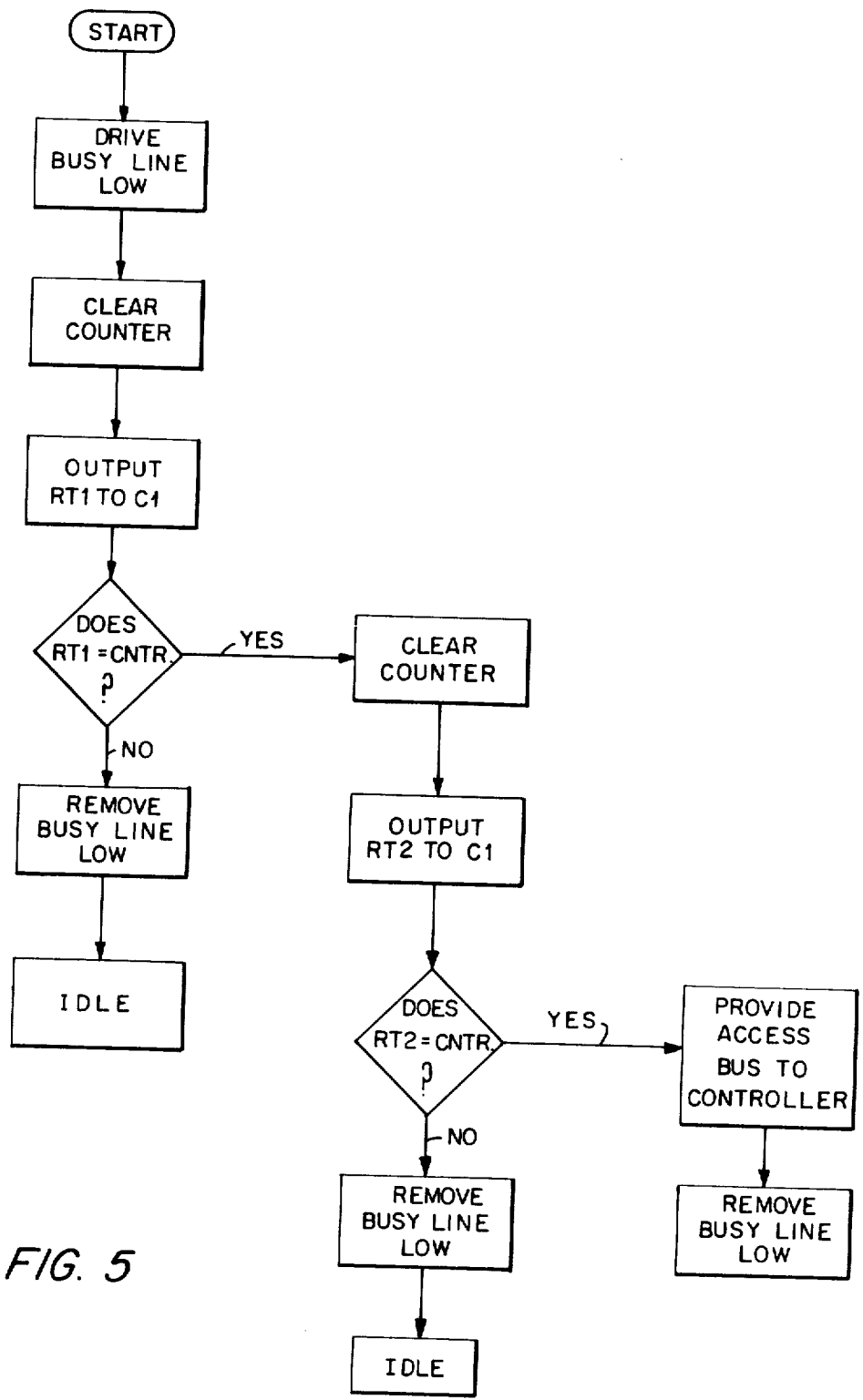
FIG. 5 is an alternate embodiment of the method of FIG. 3.

Referring to FIG. 5, an alternate embodiment of the flow diagram of FIG. 3 is shown. Much of the discussion with reference to FIG. 3 is applicable to FIG. 5; the following differences exist. The tens digit and ones digit pulses are not outputted simultaneously so line C2 and its associated counter may be eliminated from the configuration. Because the digit comparisons are performed sequentially, only devices having the highest tens digit in the arbitration will compare the ones digits; an arbitration winner is therefore guaranteed after outputting the tens and ones digits only once. Because the system of FIG. 3 outputs the digits simultaneously, it provides the possibility of having an immediate or one stage match. Therefore, the system of FIG. 3 may provide faster arbitration, especially in arbitrations where only a small number of devices compete.

For the embodiments thus far described, the priority of a device has been expressed with the decimal numbering system using two digits. Accordingly, the systems could arbitrate among devices 0-99. Many other numbering systems and coding may be preferable depending on the application. For example, if the maximum number of devices that could arbitrate for the bus was 35, it may be preferable to use a priority numbering system with a base of 6 such that the maximum number of pulses transmitted for a digit would be 6; on an average, this would shorten the time of arbitration. Furthermore, it may be preferable to use a device priority designation having more than two digits. Also, it may be to advantage to code the priority designation of devices.

For example, the designations could be binary coded decimal in which case the time slot positions of pulses on lines C1 and C2 would become important rather than the absolute number of transmitted pulses. A code could also be used which employs other codes such as the Chinese remainder theorem wherein a plurality of moduli which preferably are prime are selected. Each device would be assigned a unique code which is the remainders of the moduli divided into the decimal designation of the device. Another modification which would be obvious to one of ordinary skill in the art would be to provide a constant HIGH (or LOW) voltage to lines C1 and C2 instead of pulses, the duration of the HIGH being related to the priority of the device. Using this method, the processor could monitor the time period that lines C1 and C2 remain HIGH and increment counters CR1 and CR2.

This concludes the description of the preferred embodiment. However, many modifications and alterations will be obvious to one of ordinary skill in the art without departing from the spirit and scope of the inventive concept. Some of these modifications have been suggested herein. Therefore, it is intended that the scope of this invention be limited only by the appended claims.

What is claimed is:

1. A bus arbitration circuit of a first device connected to a common bus with a second device, said circuit determining the priority of said first device relative to said second device for gaining access to said bus, said circuit comprising:
    means for providing a first signal to a line interconnecting said first and second devices, said first signal uniquely identifying the priority of said first device in gaining access to said bus;
    said providing means comprising means for synchronizing the commencement of said first signal with a second signal from said second device to said line to form a composite signal on said line, said second signal uniquely identifying the priority of said second device in gaining access to said bus; and
    means responsive to said first signal and said composite signal for determining the priority of said first device relative to said second device for gaining access to said bus.

2. The bus arbitration circuit recited in claim 1 wherein said first signal comprises a unique priority code of pulses which defines the priority of said first device.

3. The bus arbitration circuit recited in claim 1 wherein said first signal comprises a logical voltage state, the duration of which defines the priority of said first device.

4. The bus arbitration circuit recited in claim 1 wherein said first signal comprises a plurality of sets of pulses, the combination of which defines the priority of said first device.

5. The bus arbitration circuit recited in claim 1 wherein said providing means comprises a microprocessor.

6. The bus arbitration circuit of a first device connected to a common bus with other devices for determining the priority of said first device relative to said other devices for gaining access to said bus, said circuit comprising:
    means for providing at least first and second signals respectively to first and second lines interconnecting said devices, the combination of said first and second signals uniquely identifying the priority of said first device in gaining access to said bus;
    said providing means being in synchronism with providing means of said other devices to form composite first and second signals on said first and second lines; and
    means for comparing said first and second signals of said first device with said composite first and second signals, said comparing means determining the priority of said first device relative to said other devices for gaining access to said bus.

7. The bus arbitration circuit recited in claim 6 wherein said first and second signals comprise codes of pulses.

8. The bus arbitration circuit recited in claim 6 wherein said first and second signals comprise logical voltage states, the duration of which define the priority of said first device.

9. The bus arbitration circuit recited in claim 6 wherein said providing means comprises a microprocessor.

10. In combination:
    a bus for transferring digital information;
    a plurality of devices connected to said bus, said devices comprising means for transferring digital signals onto said bus;
    each of said plurality of devices further comprising a bus arbitration circuit;
    first and second lines interconnecting said bus arbitration circuits;
    each of said bus arbitration circuits comprising means for providing a first signal to said first line and a second signal to said second line, the combination of said first and second signal of each device identifying the priority of its device relative to other devices for gaining access to said bus;
    means coupled between said plurality of devices for synchronizing the commencement of said first and second signals to form a first composite signal on said first line and a second composite signal on said second line; and
    each of said bus arbitration circuits further comprising means for comparing said first and second signal from its device respectively with said first and second composite signals to determine the priority of its device relative to other devices.

11. The combination in accordance with claim 10 wherein said first and second signals comprise pulses.

12. The combination in accordance with claim 10 wherein said first and second signals comprise logical voltage states.

13. The combination in accordance with claim 10 wherein said providing means comprises a microprocessor.

14. The method of providing bus arbitration for a plurality of devices requesting simultaneous access to a common bus, comprising the steps of:
    each device simultaneously providing a first signal to a first line to form a first composite signal, said first line interconnecting said plurality of devices;
    each device simultaneously providing a second signal to a second line to form a second composite signal, said second line interconnecting said plurality of devices, the combination of said first and second signals of each device identifying the priority of its device;
    each device comparing its provided first and second signals respectively with said first and second composite signals to determine its priority relative to other devices in gaining access to said bus.

* * * * *